(12) United States Patent
Mönnich et al.

(10) Patent No.: US 10,756,608 B2
(45) Date of Patent: Aug. 25, 2020

(54) ELECTRODYNAMIC CONVERTER

(71) Applicant: TECHNISCHE UNIVERSITÄT BERLIN, Berlin (DE)

(72) Inventors: Oliver Mönnich, Berlin (DE); Martin Kelp, Berlin (DE); Robert Dreyer, Berlin (DE)

(73) Assignee: Technische Universitat Berlin, Berlin (DE)

( * ) Notice: Subject to any disclaimer, the term of this patent is extended or adjusted under 35 U.S.C. 154(b) by 686 days.

(21) Appl. No.: 15/513,063

(22) PCT Filed: Sep. 22, 2015

(86) PCT No.: PCT/DE2015/100399
§ 371 (c)(1),
(2) Date: Jul. 20, 2017

(87) PCT Pub. No.: WO2016/045663
PCT Pub. Date: Mar. 31, 2016

(65) Prior Publication Data
US 2017/0331354 A1  Nov. 16, 2017

(30) Foreign Application Priority Data
Sep. 22, 2014  (DE) .................. 10 2014 113 648

(51) Int. Cl.
*H02K 1/24* (2006.01)
*H02K 21/44* (2006.01)
(Continued)

(52) U.S. Cl.
CPC ............. *H02K 21/44* (2013.01); *H02K 1/246* (2013.01); *H02K 19/24* (2013.01); *H02K 21/044* (2013.01); *H02K 21/125* (2013.01); *H02K 1/2726* (2013.01)

(58) Field of Classification Search
CPC .......... H02K 1/17; H02K 1/223; H02K 1/226; H02K 1/27–2793; H02K 16/00
See application file for complete search history.

(56) References Cited

U.S. PATENT DOCUMENTS

| 5,543,677 A | 8/1996 | Fakler |
| 6,867,530 B2 | 3/2005 | Gamm et al. |

(Continued)

FOREIGN PATENT DOCUMENTS

| DE | 165101 C | 11/1904 |
| DE | 3917343 A1 | 11/1990 |

(Continued)

OTHER PUBLICATIONS

International Search Report (in English and German) and Written Opinion of the International Searching Authority (in German) issued in PCT/DE2015/100399, dated Feb. 4, 2016; ISA/EP.

*Primary Examiner* — Ramon M Barrera
(74) *Attorney, Agent, or Firm* — Harness Dickey

(57) ABSTRACT

The application relates to an electrodynamic converter (1), comprising a coil (11), a claw disk (7) associated with the coil (11) and having a disk component (7a) that can be rotated about an axis of rotation and a disk component (7b) that is stationary relative thereto, comprising a further claw disk (8) associated with the coil (11) and having a disk component (8a) that can be rotated about the axis of rotation and a disk component (8b) that is stationary relative thereto, and comprising magnetic flux components, which have oppositely magnetized magnetic components (9, 10; 12, 13) and magnetic flux elements composed of soft magnetic material, of which at least some are associated with a magnetic flux through the claw disk (7) or a further magnetic flux through the further claw disk (8) during operation, which are formed in alternation as the rotatable disk component (7a) of the claw disk (7) and the rotatable disk (Continued)

component (8a) of the further claw disk (8) are rotated, wherein the magnet-flux-closing relative positions for the claw disk (7) and the further claw disk (8) are formed having an angular offset to each other, as are also non-magnetic relative positions.

12 Claims, 7 Drawing Sheets

(51) Int. Cl.
*H02K 21/12* (2006.01)
*H02K 19/24* (2006.01)
*H02K 21/04* (2006.01)
*H02K 1/27* (2006.01)

(56) References Cited

U.S. PATENT DOCUMENTS

| | | |
|---|---|---|
| 2005/0006972 A1 | 1/2005 | Bradfield |
| 2005/0242679 A1 | 11/2005 | Walter et al. |
| 2007/0236098 A1 | 10/2007 | Kusase et al. |
| 2014/0191701 A1 | 7/2014 | Rucci |
| 2014/0354101 A1 | 12/2014 | Goto et al. |

FOREIGN PATENT DOCUMENTS

| | | |
|---|---|---|
| DE | 10106519 A1 | 8/2002 |
| DE | 10217285 A1 | 11/2003 |
| DE | 10229198 A1 | 1/2004 |
| DE | 102004032684 A1 | 3/2005 |
| DE | 102007016558 A1 | 10/2007 |
| DE | 102012001114 A1 | 7/2013 |
| WO | WO-2013153575 A1 | 10/2013 |

ELECTRODYNAMIC CONVERTER

CROSS-REFERENCE TO RELATED APPLICATIONS

This application is a national phase of PCT/DE2015/100399, filed Sep. 22 2015 which claims priority to German Serial No. 102014113648.9 filed Sep. 22, 2014. The entire disclosures of the above applications are incorporated herein by reference.

BACKGROUND

Various generator principles are available for the conversion of mechanical energy into electrical energy. The functional components are designed differently depending on the generator size. In very large generators, coils are typically used for generating the magnetic field in order to avoid expensive permanent magnets. However, the generation of the magnetic field by means of an electric current is always associated with losses that deteriorate the efficiency. It is therefore common practice to use permanent magnets in small and medium-sized generators. The energy conversion is frequently realized with the inversion of the d.c. motor or synchronous motor principle and more rarely with the inversion of the asynchronous motor principle.

In addition, there also exist so-called transverse flux machines, but these machines are not widely used other than as automobile generators. The main problem of transverse flux machines is their structure, which is usually associated with unreasonably high manufacturing costs. This can be attributed, in particular, to the required complicated geometry of the flux-conducting components. Claw pole generators represent a special type of transverse flux machines. Claw pole generators have been used in large quantities as generators in the automotive industry for quite some time (see, for example, DE 10 2007 016 558 and DE 10 2004 032 684). Claw pole generators are furthermore described in documents DE 101 06 519 and DE 102 29 198, wherein a claw pole generator without slip ring is described in DE 39 17 343. Document DE 10 2012 001 114 discloses a design of a stator for a transverse flux machine.

A miniaturized claw pole generator is disclosed in document DE 102 17 285.

The main disadvantage of conventional claw pole machines is their high detent torque. This detent torque can in fact be slightly reduced with a suitable design of the claws. However, it could not be eliminated in any claw pole machines known so far due to the corresponding structural design.

The demand for miniaturized generators for the electrical supply of low consumer loads has significantly increased in recent years. These miniaturized generators serve for supplying devices with energy in an autarkic fashion in order to thereby make available new functions. These functions frequently concern the acquisition and wireless relaying of sensor data. The required power is frequently so low such that conversion principles other than electromagnetic generators, for example piezoelectric generators, are also explored. However, their power output is significantly lower such that they are only suitable for special applications. This field is generally referred to as "energy harvesting." As the interlinking of sensors in the industrial environment and in all types of consumer electronics increases, the demand for miniaturized generators will also continue to increase in the future.

SUMMARY

The invention is based on the objective of developing an electrodynamic converter with improved operating characteristics.

This objective is attained with an electrodynamic converter according to independent claim 1. Embodiments of the electrodynamic converter form the objects of the dependent claims.

The invention proposes an electrodynamic converter. A claw disk is assigned to a coil and arranged on one side of the coil. The claw disk features a disk component that is rotatable about an axis of rotation and a disk component that is stationary relative thereto, wherein the rotatable and the stationary disk components feature mutually assigned claws, which alternately assume relative positions for the claw disk, in which the magnetic flux circuit is closed and not closed, during the rotation of the rotatable disk component. An additional claw disk is assigned to the coil and arranged on the opposite side thereof, wherein this additional claw disk features a disk component that is rotatable about the axis of rotation and a disk component that is stationary relative thereto, and wherein the rotatable and the stationary disk components feature mutually assigned claws, which alternately assume relative positions for the additional claw disk, in which the magnetic flux circuit is closed and not closed, during the rotation of the rotatable disk component. The electrodynamic converter comprises magnetic flux components that feature oppositely magnetized magnetic components and magnetic flux elements of soft magnetic material. During the operation, at least some of the magnetic flux components are respectively assigned to a magnetic flux through the claw disk or an additional magnetic flux through the additional claw disk, which are alternately generated during the rotation of the rotatable disk component of the claw disk and the rotatable disk component of the additional claw disk. The relative positions for the claw disk and the additional claw disk, in which the magnetic flux circuit is closed, and the relative positions, in which the magnetic flux circuit is not closed, are respectively realized with an angular offset to one another.

The electrodynamic converter has a simple design and can be cost-efficiently manufactured. The design of the electrodynamic converter can be readily miniaturized.

The axis of rotation is formed by a component that may consist, for example, of a shaft, particularly a rotor shaft. The rotatable disk components may rotate with the shaft.

The rotatable disk components are fixed in their relative position to one another at least during the operation such that a defined angular offset is realized. This applies analogously to the stationary disk components of the claw disk and the additional claw disk. During the rotation of the rotatable disk components, the magnetic flux in the electrodynamic converter alternately extends through the claw disk and the additional claw disk. Magnetic flux elements may be involved in the magnetic flux circuit through the claw disk, as well as in the magnetic flux circuit through the additional claw disk, or in only one of the magnetic flux circuits.

The claws are also referred to as tooth elements or teeth such that a tooth element disk or toothed disk is used in this case.

The electrodynamic converter may feature a housing. In this embodiment, the stationary disk components may be arranged on the housing. Alternatively, the housing may be mounted rotatably. In this case, the rotatable disk components may rotate with the housing during the operation.

The coil may be mounted such that it is rotatable about the axis of rotation. Alternatively, the coil may be fixed relative to the axis of rotation, for example on the housing.

The oppositely magnetized magnetic components may comprise permanent magnets. During the operation, the permanent magnets may be involved in the magnetic flux circuit through the claw disk and/or the additional magnetic flux circuit through the additional claw disk.

The oppositely magnetized magnetic components may comprise electric magnets. Electric magnets may be realized, for example, with one or more coils.

The oppositely magnetized magnetic components may comprise magnetic components that are magnetized axially and/or radially referred to the axis of rotation. If a shaft such as a rotor shaft is provided, oppositely magnetized magnetic components may be arranged on the shaft or, in particular, also form part thereof.

With respect to the housing, one or more housing parts may be realized in the form of magnetic flux elements of soft magnetic material. The housing parts of soft magnetic material may include, for example, covers arranged on one or both sides. In addition, a bearing device for a shaft may at least partially consist of a soft magnetic material.

The magnetic flux elements may be realized such that they bypass a bearing device for a shaft forming the axis of rotation and thereby close the magnetic flux circuit. The magnetic flux elements may be realized in the form of components that extend around the bearing device, namely with one or more gaps or without a gap, in order to thereby guide the magnetic flux circuit around the bearing device.

The claw disk and the additional claw disk may respectively have multiple relative positions, for example at least four relative positions, in which the magnetic flux circuit is closed. It is also possible to realize an embodiment with eight relative positions, in which the magnetic flux circuit is closed, during a relative rotation between the rotatable and the stationary disk component.

Claw arrangements, which are in the same embodiment formed on the rotatable disk component of the claw disk and on the rotatable disk component of the additional claw disk, may be arranged with an angular offset to one another. The claw arrangements may be realized identically at least with respect to the number and shape of the claws. Alternatively, they may be realized with respect to the angular offset between the stationary disk components. In any case, the relative position of the disk components, which are arranged with an angular offset to one another, is fixed during the operation.

In the claw disk and/or in the additional claw disk, the rotatable disk component may be realized in the form of an inner disk component and the stationary disk component may be realized in the form of an outer disk component. In this or other embodiments, mutually assigned claws may lie opposite of one another and be separated by an air gap at least in the relative position, in which the magnetic flux circuit is closed.

The claws on the rotatable disk component and the stationary disk component may be realized in the form of claws with the shape of a circular arc segment. The lateral edges of the claws may extend parallel to one another.

In the relative position, in which the magnetic flux circuit is closed, a gap between opposing edges of assigned claws formed on the rotatable and the stationary disk components may have an essentially constant width in the radial direction.

DESCRIPTION OF EXEMPLARY EMBODIMENTS

Exemplary embodiments of the invention are described in greater detail below with reference to the drawings. In these drawings:

FIG. 1 shows a schematic cross section through an electrodynamic converter,

FIG. 2 shows a schematic section through a claw disk with an inner disk component and an outer disk component in a relative position, in which the magnetic flux circuit is closed, along the line A-A and FIG. 1, FIG. 3 shows a schematic section through the claw disk according to FIG. 2 in a relative position, in which the magnetic flux circuit is not closed, along the line B-B in FIG. 1, FIG. 4 shows a schematic representation of another claw disk with an inner disk component and an outer disk component in a relative position, in which the magnetic flux circuit is closed, FIG. 5 shows a schematic representation of the claw disk according to FIG. 4 in a relative position, in which the magnetic flux circuit is not closed, FIG. 6 shows a schematic section through an electrodynamic converter, in which a magnetic flux extends through a claw disk arranged on the right side, FIG. 7 shows a schematic representation of the electrodynamic converter according to FIG. 6, in which the magnetic flux extends through a claw disk arranged on the left side, FIG. 8 shows a schematic section through an electrodynamic converter, in which a coil is arranged on a rotor shaft, FIG. 9 shows a schematic section through an electrodynamic converter, in which magnetic elements realized in the form of permanent magnets form part of a rotor shaft, FIG. 10 shows a schematic section through an electrodynamic converter, in which magnetic elements realized in the form of permanent magnets form part of a housing cover, FIG. 11 shows a schematic section through an electrodynamic converter, in which the magnetic elements are realized with coils, FIG. 12 shows a schematic section through an electrodynamic converter, in which magnetic flux elements of a bearing are realized such that they close the magnetic flux circuit, FIG. 13 shows a schematic representation of a star-shaped cover with coils in order to generate magnetic flux for an electrodynamic converter, and FIG. 14 shows a perspective representation of an embodiment of an electrodynamic converter.

FIG. 1 shows a schematic cross section through a segment of an electrodynamic converter 1. A rotor shaft 2 is provided and mounted on covers 4, 5 of a housing 6 with the aid of a bearing device 3.

A claw disk 7, as well as an additional claw disk 8, is accommodated in the housing 6. The claw disk 7 features a rotatable disk component 7a that is arranged on the rotor shaft 2. A stationary disk component 7b of the claw disk 7 is arranged on the housing 6. The additional claw disk 8 similarly features a rotatable disk component 8a and a stationary disk component 8b.

FIGS. 2 and 3 and FIGS. 4 and 5 respectively show potential designs of the claw disk 7 and the additional claw disk 8. In this case, the rotatable disk component 7a, 8a is realized in the form of an inner disk component whereas the stationary disk component 7b, 8b forms an outer disk component. In an alternative (not-shown) embodiment, the disk components 7a, 8a may be stationary and the disk components 7b, 8b may be rotatable. The rotatable and the stationary disk components 7a, 7b; 8a, 8b respectively feature claws 7a.1, 7b.1; 8a.1, 8b.1 that are arranged on the outside or on the inside. The claws 7a.1, 7b.1; 8a.1, 8b.1 may be alternatively referred to as teeth or tooth elements.

As the respective rotatable disk component 7a, 8a is rotated during the operation by rotating the rotor shaft 2 and thereby moved into different relative positions referred to the respective stationary disk component 7b, 8b, the claw disk 7 and the additional claw disk 8 reach relative positions (rotational positions), in which the magnetic flux circuit is closed (see FIGS. 2 and 4), as well as relative positions, in which the magnetic flux circuit is not closed (see FIGS. 3 and 5). A magnetic flux through the respective claw disk is generated when the claw disk is in a relative position, in which the magnetic flux circuit is closed as shown in FIGS. 2 and 4. According to FIGS. 6 and 7, magnetic elements 9, 10, which are realized in the form of oppositely magnetized permanent magnets in the embodiments shown, are then involved in the corresponding magnetic flux circuit. In this embodiment, a compensation of the detent torque is achieved, in particular, by utilizing two claw disks 7, 8 that are offset relative to one another. When the first claw disk is closed, the second claw disk is open. A rotation of the rotor shaft relative to the housing leads to the closing of the open claw disk whereas the closed claw disk is opened. The detent torque results from the lever arm and the reluctance force. The latter can be attributed to the change in reluctance. Due to the utilization of two claw disks, it is possible to maintain the sum of the two reluctances nearly constant such that only a very small change in the overall reluctance and therefore a very low detent torque are achieved.

The embodiments according to FIGS. 6 and 7 show permanent magnets that are oppositely magnetized referred to the axial direction and form part of the housing 6. Alternatively, the oppositely magnetized magnetic elements 9, 10 may also be arranged in the cover 4, 5 or on the rotor shaft 2 as illustrated in FIGS. 9 and 10.

The claw disk 7 and the additional claw disk 8 are arranged in the housing 6 on opposite sides of a coil 11, which is realized in the form of a cylindrical coil in the exemplary embodiment shown.

In the embodiments according to FIGS. 1, 6, 7 and 9-12, the coil 11 is accommodated on the housing 6. In FIG. 1, the coil is rigidly connected to the housing. This may be advantageous if the housing 6 is stationary and the rotor shaft 2 rotates because the supply lines can be easily routed out of the housing. If the housing is rotatable, however, it may be advantageous to accommodate the coil 11 on the rotor shaft 2 as shown in FIG. 8. Since the housing 2 lies farther outward, it typically has a higher mass moment of inertia than the rotor shaft 2. It may therefore be advantageous to allow the housing to rotate while the rotor shaft 2 remains stationary if a large amount of energy should be stored in the rotating component or if strict requirements with respect to a smooth operation apply.

In FIGS. 6 and 7, the respective magnetic flux indicated with arrows A1, A2, B1, B2 extends through the claw disk 7 (see FIG. 7) and the additional claw disk 8 (see FIG. 6) depending on the rotational position of the claw disk 7 and the additional claw disk 8. If a claw disk designed in accordance with FIGS. 2 and 3 is used, this means that the claw disk 7 is in FIG. 6 arranged in the relative position according to FIG. 3 and in FIG. 7 arranged in the relative position according to FIG. 2. The exact opposite applies to the additional claw disk 8 due to the angular offset between the respective relative positions of the claw disk 7 and the additional claw disk 8, in which the magnetic flux circuit is closed. In this case, the magnetic flux extends through the bearing device 3.

FIG. 11 shows a schematic section through an electrodynamic converter, in which the magnetic elements are realized with coils 12, 13.

FIG. 12 shows a schematic section through an electrodynamic converter, in which magnetic elements 3a, 3b of soft magnetic material are provided in order to bypass the magnetic flux through the bearing device 3. The bearing device 3 is bypassed. This may be advantageous if the bearings have an excessively high reluctance or eddy currents in the bearing cages lead to a braking torque.

In FIG. 14, identical components are identified by the same reference symbols as in the preceding figures.

In comparison with conventional electrodynamic converters featuring a claw disk or tooth element disk, a simplified design is particularly achieved, for example, by using two magnets that are continuously magnetized referred to an axial direction rather than individual magnets or alternately magnetized magnets. Individual magnets require a more elaborate installation and have a tendency to shift. Alternately magnetized permanent magnets, in contrast, require an elaborate manufacture. Both increase the costs and therefore preclude commercial use. However, axially magnetized magnets can be easily manufactured and, depending on the respective customer requirements, are also available in special sizes at different suppliers for a comparatively reasonable price.

According to the proposed design, the air gap may in the different embodiments lie between two flux-conducting soft iron components. These components can be very precisely manufactured without additional effort such that the air gap can be very accurately adjusted. This represents yet another advantage over other concepts, in which the permanent magnets are also involved in defining the air gap. These permanent magnets typically have a tolerance of +/−0.1 mm, which is the reason why the air gap also has large tolerances. This has two disadvantageous effects. On the one hand, relatively strong fluctuations of the magnetic flux and therefore the output power of the generator occur. In addition, air gaps that deviate from the calculation or over the circumference can interfere with the compensation of the detent torque and therefore significantly increase this detent torque.

The magnetic flux respectively takes the path of least reluctance from the magnetic elements, namely regardless of whether they are realized in the form of permanent magnets on the basis of coils. When a claw disk is closed, almost the entire flux extends through this claw disk. When the rotor shaft 2 rotates relative to the housing 6, the two claw disks 7, 8 are closed offset to one another such that an alternating flux extends through the coil 11. This leads to the induction of the generator voltage in the coil 11.

Figure 1:
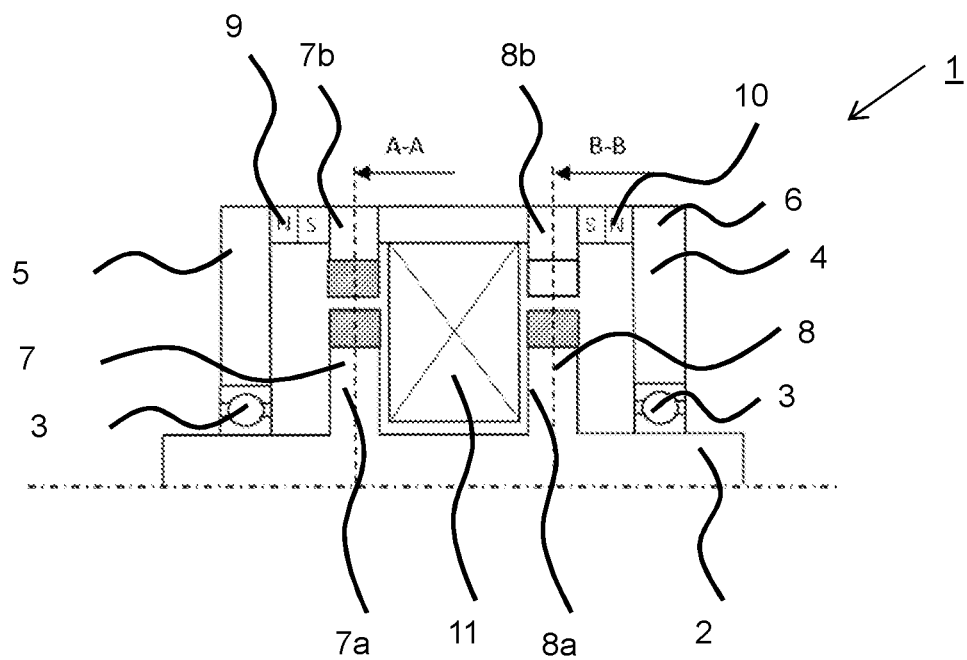
Figure 2:
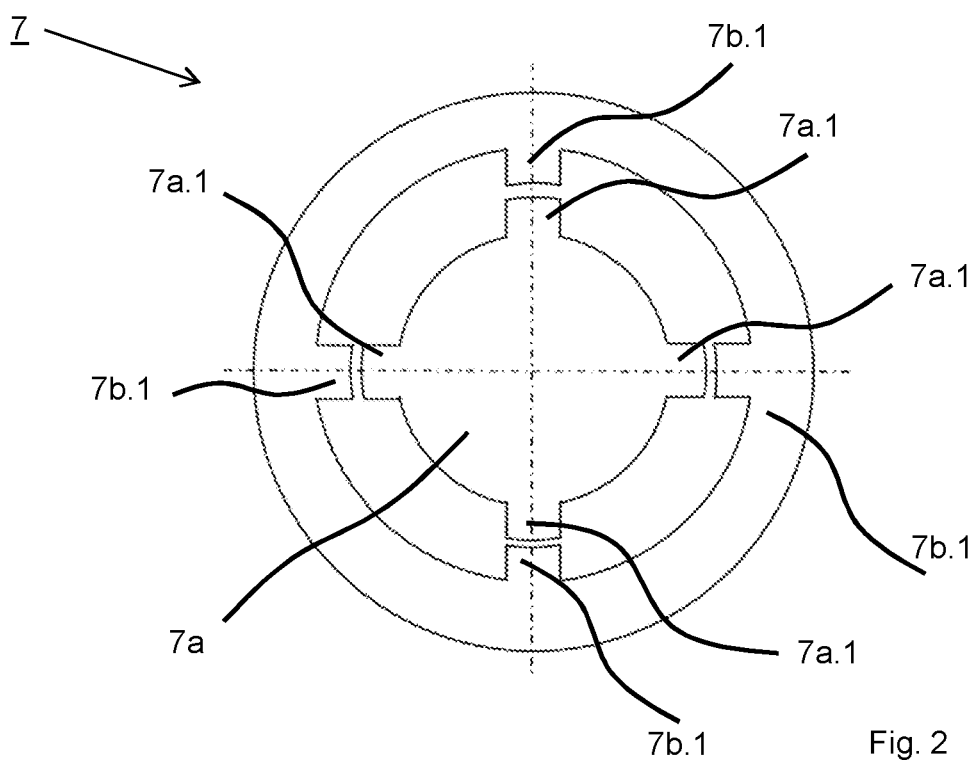
Figure 3:
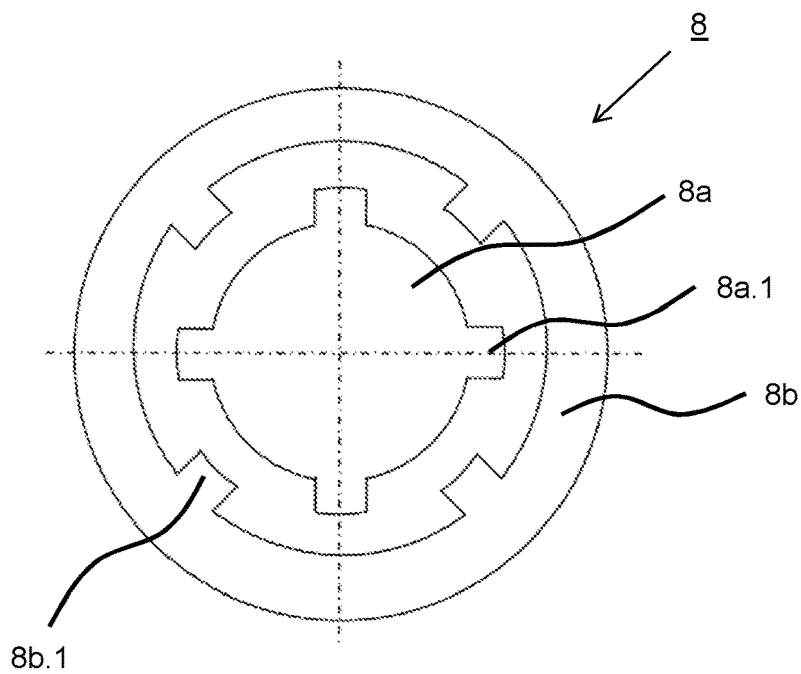
Figure 4:
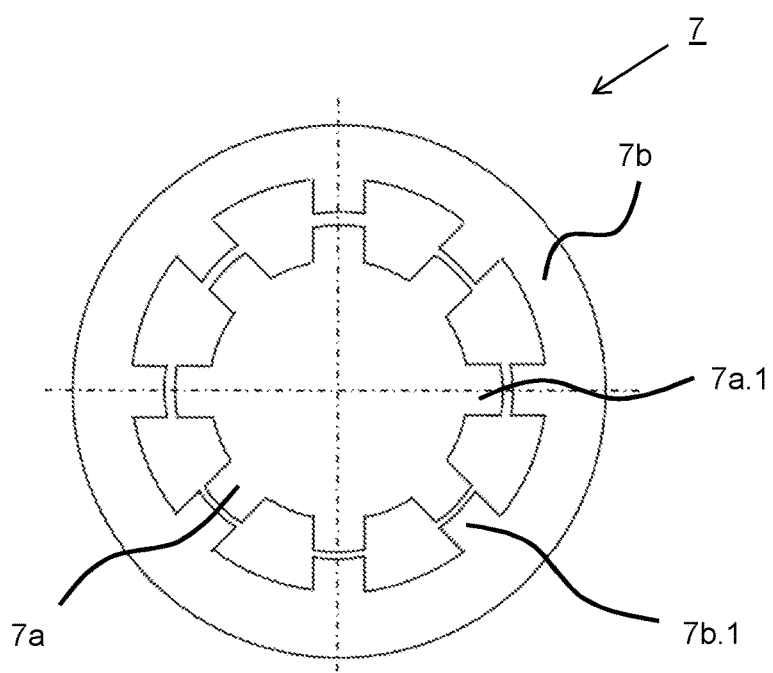
Figure 5:
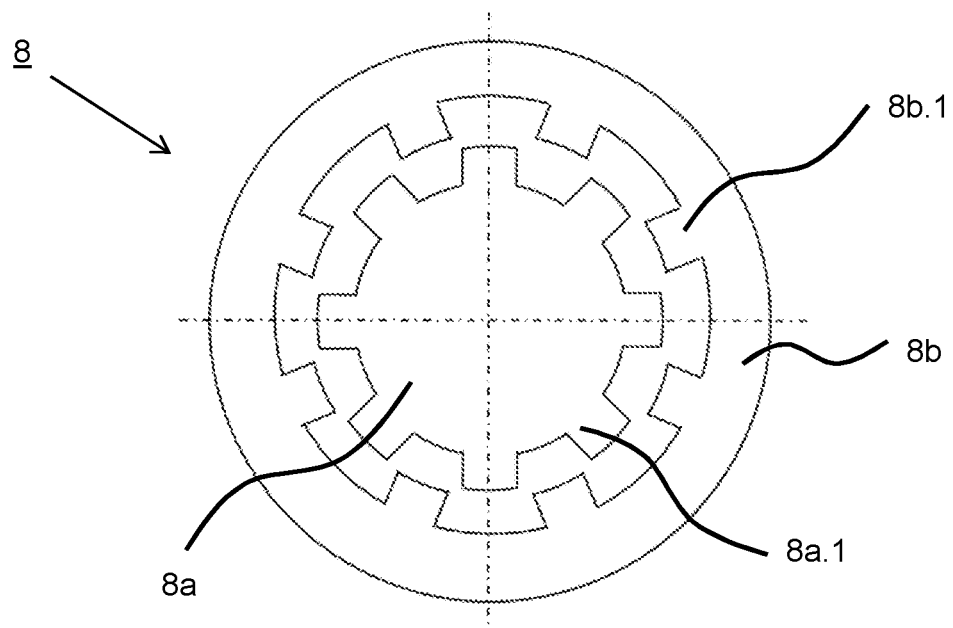
Figure 6:
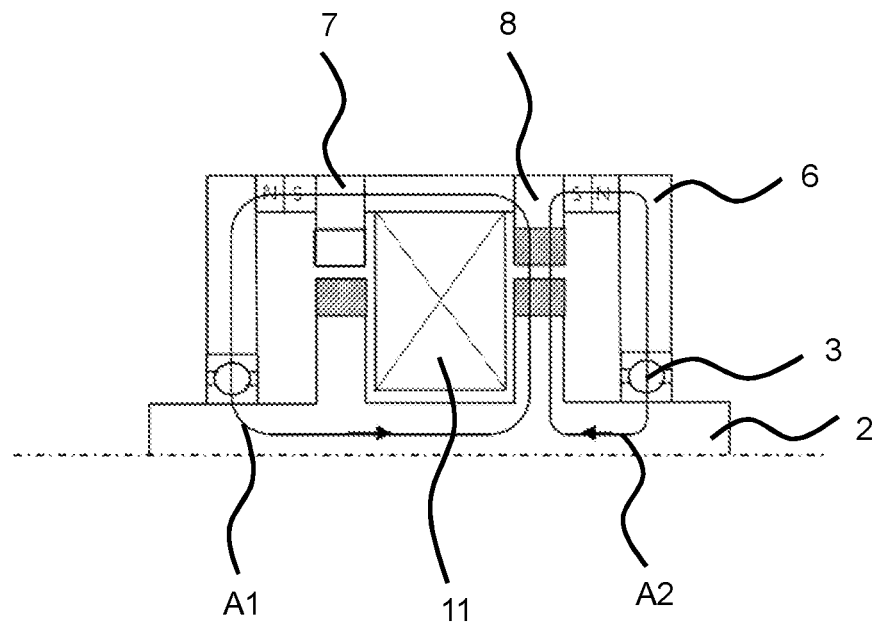
Figure 7:
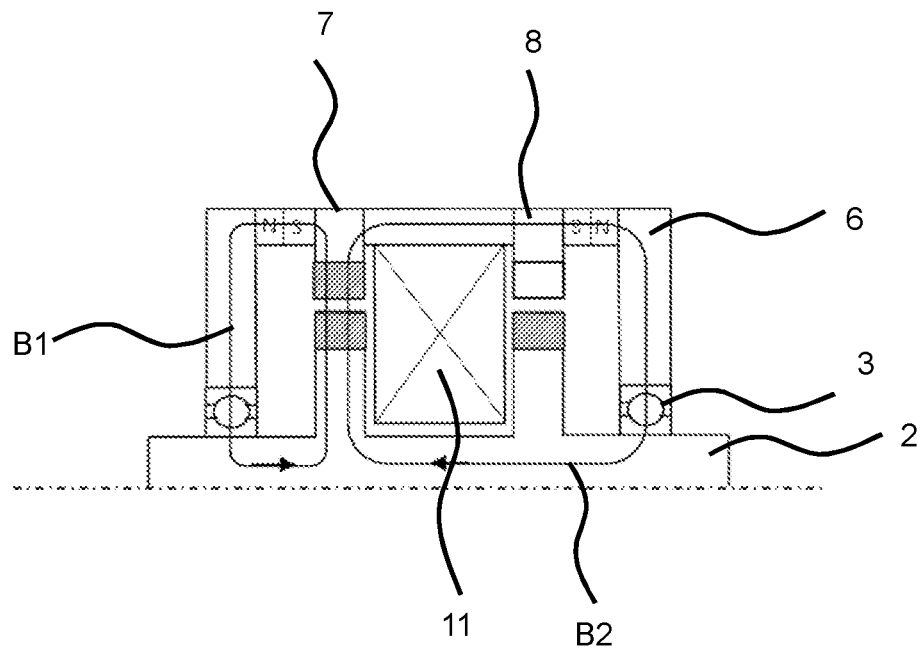
Figure 8:
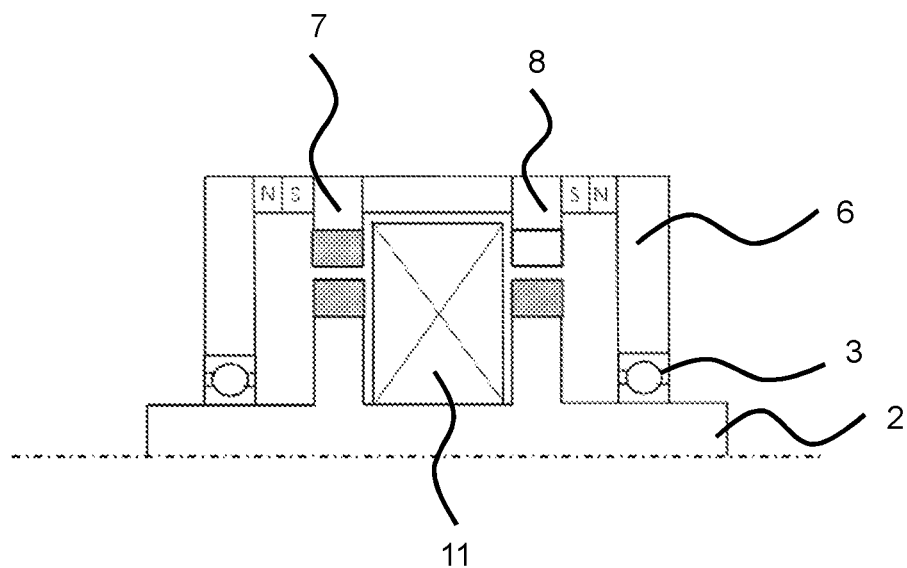
Figure 9:
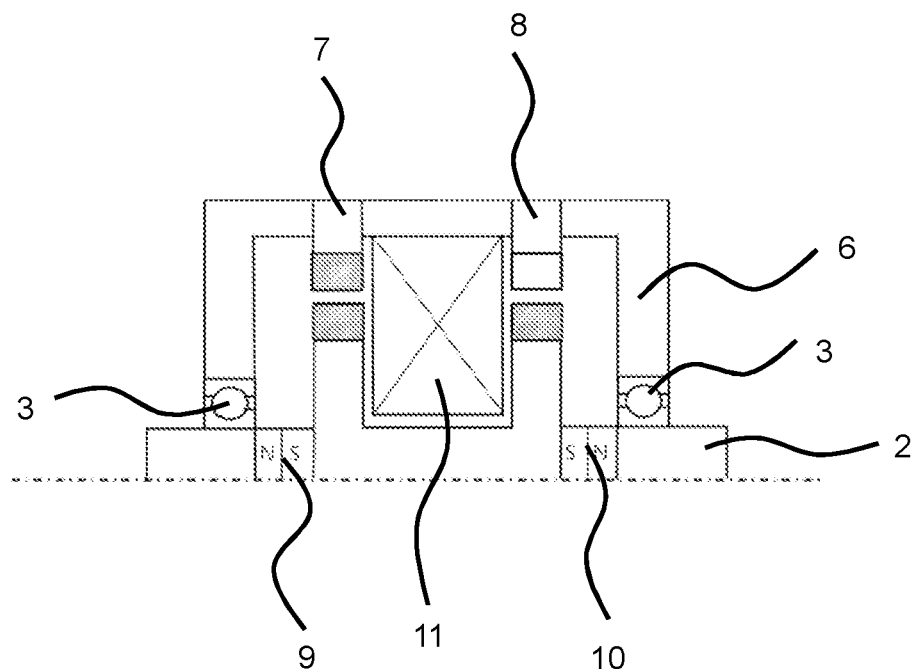
Figure 10:
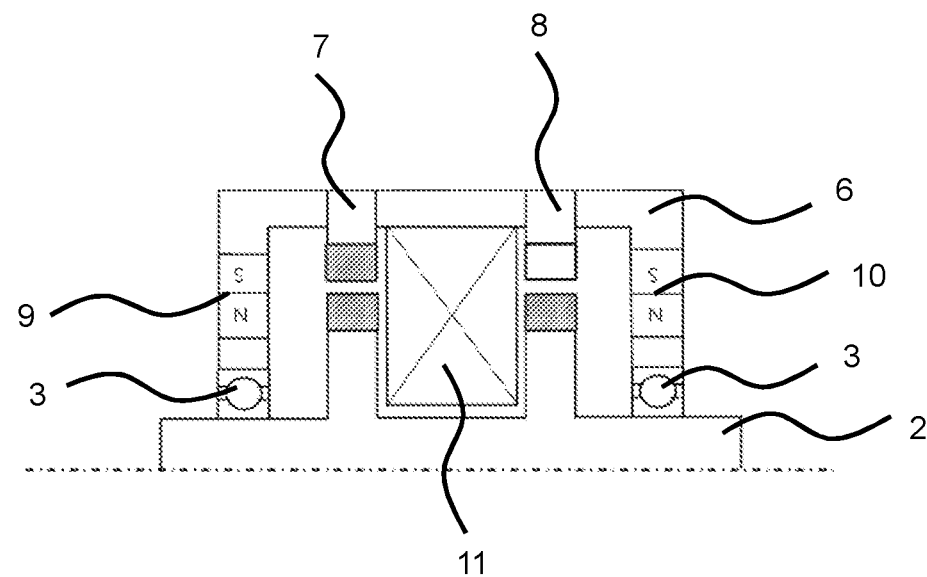
Figure 11:
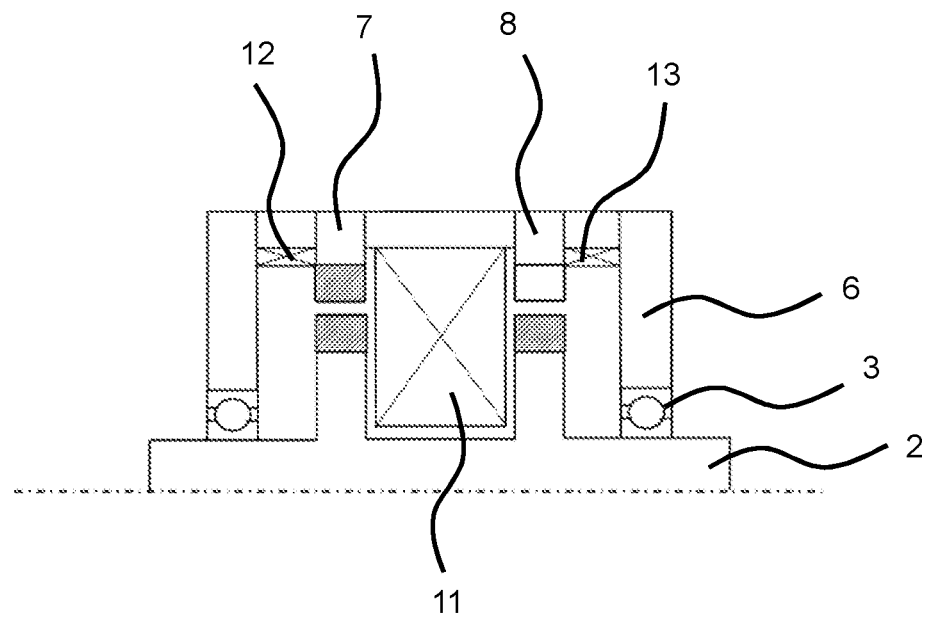
Figure 12:
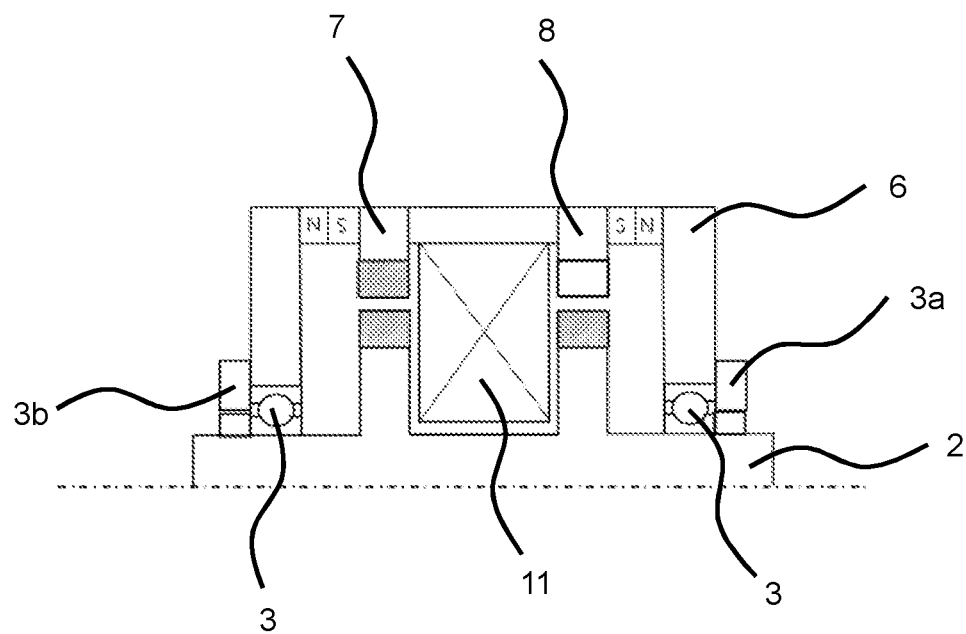
Figure 13:
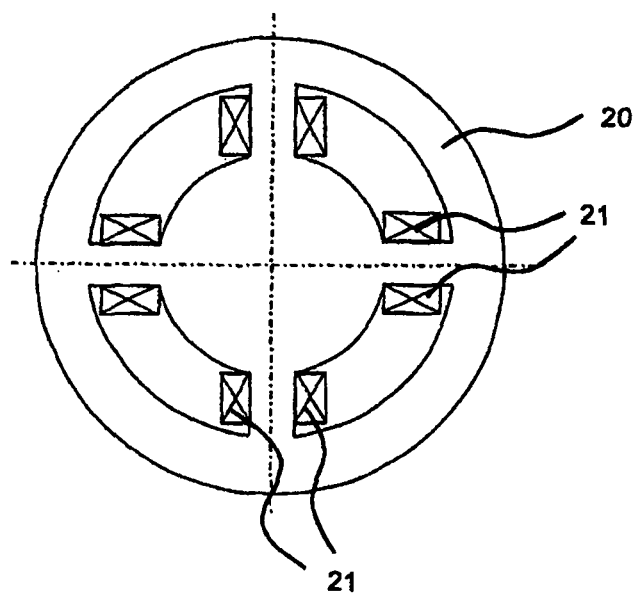
FIG. 13 shows a schematic representation of a star-shaped housing cover 20 with coils 21 in order to generate magnetic flux for an electrodynamic converter according to one of the described embodiments, wherein four of said coils are illustrated in this figure.
Figure 14:
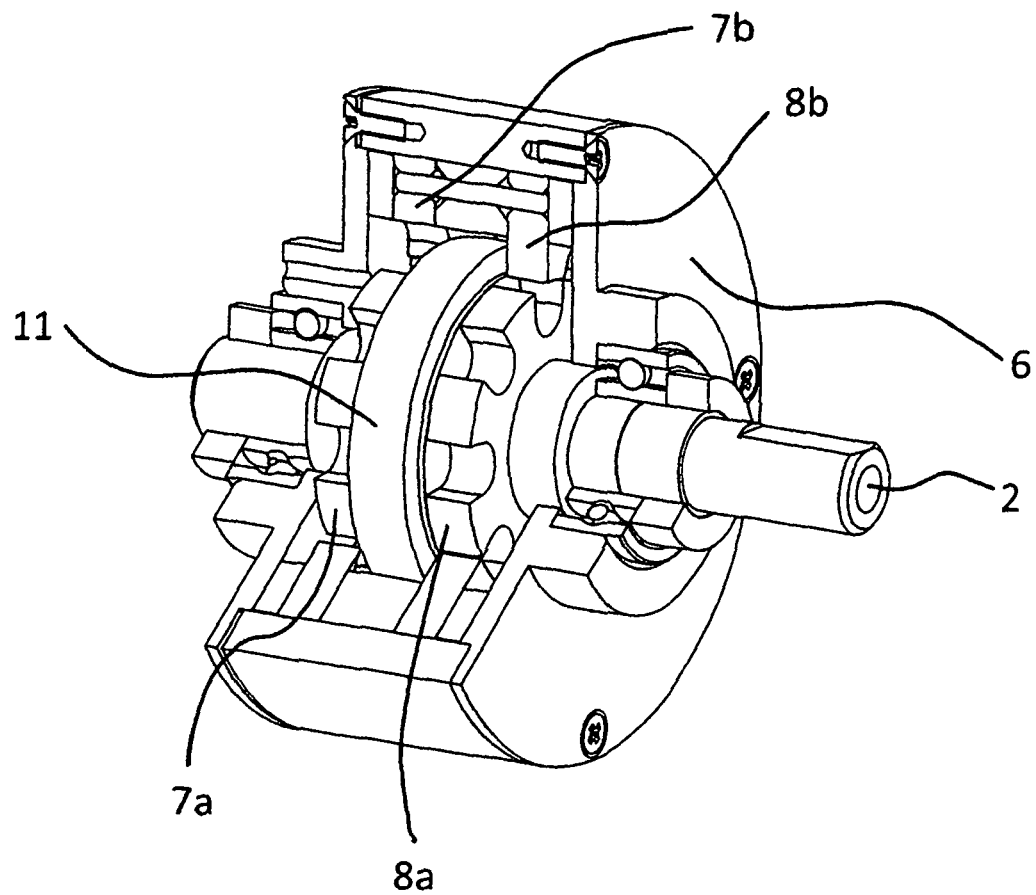
FIG. 14 shows a perspective representation of an electrodynamic converter.

The magnetic flux can also be generated without permanent magnets by means of two or more coils 12, 13, 21. These coils may once again be connected to the housing 6 (see FIGS. 11 and 13) or the rotor shaft 2.

Depending on the design of the electrodynamic converter, it may be advantageous to directly wind one or more coils on the rotor shaft 2 such that the shaft does not have to be divided in order to slip on the coil between the claw disks 7, 8.

The number and width of the claws or tooth elements is variable and can be optimally adapted. Furthermore, the claw shape may also be changed by rounding off the edges or beveling the claws along the longitudinal axis in order to thereby achieve an improved guidance of the magnetic flux, as well as reduced detent torques.

As long as the current feed is suitably configured, the different embodiments of the electrodynamic converter can also be used as a motor if at least two units are connected to one another on a shaft or otherwise.

The characteristics disclosed in the preceding description, the claims and the drawings may be important for the realization of the different embodiments individually, as well as in any combination.

The invention claimed is:

1. An electrodynamic converter comprising
    a coil,
    a claw disk that is assigned to the coil and arranged on one side of the coil, wherein said claw disk features a disk component that is rotatable about an axis of rotation and a disk component that is stationary relative thereto, and wherein the rotatable and the stationary disk components feature mutually assigned claws, which alternately assume relative positions for the claw disk, in which the magnetic flux circuit is closed and not closed, during the rotation of the rotatable disk component,
    an additional claw disk that is assigned to the coil and arranged on the opposite side of the coil, wherein said additional claw disk features a disk component that is rotatable about the axis of rotation and a disk component that is stationary relative thereto, and wherein the rotatable and the stationary disk components feature mutually assigned claws, which alternately assume relative positions for the additional claw disk, in which the magnetic flux circuit is closed and not closed, during the rotation of the rotatable disk component, and
    magnetic flux components that feature oppositely magnetized magnetic components and magnetic flux elements of soft magnetic material, wherein at least some of said magnetic flux components are respectively assigned to a magnetic flux through the claw disk or an additional magnetic flux through the additional claw disk, which are alternately generated during the rotation of the rotatable disk component of the claw disk and the rotatable disk component of the additional claw disk,
    wherein the relative positions for the claw disk and the additional claw disk, in which the magnetic flux circuit is closed, and the relative positions, in which the magnetic flux circuit is not closed, are respectively realized with an angular offset to one another.

2. The electrodynamic converter according to claim 1, characterized in that the oppositely magnetized magnetic components comprise permanent magnets.

3. The electrodynamic converter according to claim 1, characterized in that the oppositely magnetized magnetic components comprise electric magnets.

4. The electrodynamic converter according to claim 1, characterized in that the oppositely magnetized magnetic components comprise magnetic components, which are magnetized axially and/or radially referred to the axis of rotation.

5. The electrodynamic converter according to claim 1, characterized by a housing, wherein one or more housing parts of the housing are realized in the form of magnetic flux elements of soft magnetic material.

6. The electrodynamic converter according to claim 1, characterized in that the magnetic flux elements are realized such that they bypass a bearing device for a shaft rotating about the axis of rotation and thereby close the magnetic flux circuit.

7. The electrodynamic converter according to claim 1, characterized in that the claw disk and the additional claw disk respectively have multiple relative positions, in which the magnetic flux circuit is closed.

8. The electrodynamic converter according to claim 1, characterized in that claw arrangements, which are in the same embodiment formed on the rotatable disk component of the claw disk and on the rotatable disk component of the additional claw disk, are arranged with an angular offset to one another.

9. The electrodynamic converter according to claim 1, characterized in that the rotatable disk component of the claw disk and/or in the additional claw disk is realized in the form of an inner disk component and the stationary disk component is realized in the form of an outer disk component.

10. The electrodynamic converter according to claim 1, characterized in that the claws on the rotatable disk component and the stationary disk component are realized in the form of claws with the shape of a circular arc segment.

11. The electrodynamic converter according to claim 1, characterized in that a gap between opposing edges of assigned claws formed on the rotatable and the stationary disk component has an essentially constant width in the radial direction in the relative position, in which the magnetic flux circuit is closed.

12. The electrodynamic converter according to claim 1, characterized in that the coil is arranged on a rotor shaft and rotatable together with this rotor shaft.

* * * * *